(12) United States Patent
Hershman et al.

(10) Patent No.: US 10,452,582 B2
(45) Date of Patent: Oct. 22, 2019

(54) SECURE ACCESS TO PERIPHERAL DEVICES OVER A BUS

(71) Applicant: Nuvoton Technology Corporation, Hsin-chu (TW)

(72) Inventors: Ziv Hershman, Givat Shmuel (IL); Moshe Alon, Tel-Aviv (IL); Dan Morav, Herzliya (IL); Oren Tanami, Ra'anana (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 0 days.

(21) Appl. No.: 15/955,715

(22) Filed: Apr. 18, 2018

(65) Prior Publication Data

US 2018/0239727 A1 Aug. 23, 2018

Related U.S. Application Data

(63) Continuation-in-part of application No. 15/075,219, filed on Mar. 21, 2016, now Pat. No. 10,095,891.

(60) Provisional application No. 62/172,298, filed on Jun. 8, 2015.

(51) Int. Cl.
*G06F 13/362* (2006.01)
*G06F 13/42* (2006.01)
*G06F 21/85* (2013.01)
*G06F 21/60* (2013.01)
*G06F 21/64* (2013.01)

(52) U.S. Cl.
CPC ........ *G06F 13/362* (2013.01); *G06F 13/4221* (2013.01); *G06F 13/4291* (2013.01); *G06F 21/606* (2013.01); *G06F 21/64* (2013.01); *G06F 21/85* (2013.01)

(58) Field of Classification Search
None
See application file for complete search history.

(56) References Cited

U.S. PATENT DOCUMENTS

| | | | |
|---|---|---|---|
| 5,713,006 A * | 1/1998 | Shigeeda | G06F 1/1616 710/8 |
| 5,740,404 A * | 4/1998 | Baji | G06F 12/0653 710/16 |
| 7,155,615 B1 * | 12/2006 | Silvester | G06F 21/80 713/185 |
| 7,496,929 B2 * | 2/2009 | Dunstan | G06F 9/4403 719/320 |
| 7,797,115 B2 | 9/2010 | Tasher et al. | |
| 9,158,628 B2 | 10/2015 | Maity et al. | |
| 9,432,298 B1 * | 8/2016 | Smith | H04L 49/9057 |
| 2006/0107032 A1 | 5/2006 | Paaske et al. | |

(Continued)

*Primary Examiner* — Michael Sun
(74) *Attorney, Agent, or Firm* — Kligler & Associates (57) ABSTRACT

A security device includes an interface and a processor. The interface is configured for connecting to a bus that serves one or more peripheral devices. The bus includes (i) one or more dedicated signals that are each dedicated to a respective one of the peripheral devices, and (ii) one or more shared signals that are shared among the peripheral devices served by the bus. The processor is connected to the bus as an additional device in addition to the peripheral devices, and is configured to disrupt on the bus a transaction in which a bus-master device attempts to access a given peripheral device, by disrupting a dedicated signal associated with the given peripheral device.

32 Claims, 4 Drawing Sheets

(56) References Cited

U.S. PATENT DOCUMENTS

| | | | |
|---|---|---|---|
| 2007/0109015 A1* | 5/2007 | Hanes | H04L 49/10 |
| | | | 326/38 |
| 2008/0282017 A1 | 11/2008 | Carpenter et al. | |
| 2010/0037321 A1 | 2/2010 | Oz et al. | |
| 2012/0163589 A1 | 6/2012 | Johnson et al. | |
| 2012/0255012 A1* | 10/2012 | Sallam | G06F 21/52 |
| | | | 726/24 |
| 2012/0255014 A1* | 10/2012 | Sallam | G06F 21/554 |
| | | | 726/24 |
| 2013/0312099 A1* | 11/2013 | Edwards | G06F 21/554 |
| | | | 726/24 |
| 2016/0188909 A1 | 6/2016 | Zatko et al. | |

\* cited by examiner

SECURE ACCESS TO PERIPHERAL DEVICES OVER A BUS

CROSS-REFERENCE TO RELATED APPLICATIONS

This application is a Continuation-In-Part (CIP) of U.S. patent application Ser. No. 15/075,219, filed Mar. 21, 2016, which claims the benefit of U.S. Provisional Patent Application 62/172,298, filed Jun. 8, 2015. The disclosures of these related applications are incorporated herein by reference.

FIELD OF THE INVENTION

The present invention relates generally to electronic-system security, and particularly to methods and systems for securing access to peripheral devices.

BACKGROUND OF THE INVENTION

Electronics systems use various types of bus interfaces for communicating between host devices and peripheral devices. Examples of bus interfaces include the Inter-Integrated-Circuit $I^2C$ bus and the Serial Peripheral Interface (SPI) bus. The $I^2C$ bus is specified, for example, in "$I^2C$ bus specification and user manual," UM10204, NXP Semiconductors, revision 6, Apr. 4, 2014, which is incorporated herein by reference.

SUMMARY OF THE INVENTION

An embodiment of the present invention that is described herein provides a security device including an interface and a processor. The interface is configured for connecting to a bus that serves one or more peripheral devices. The bus includes (i) one or more dedicated signals that are each dedicated to a respective one of the peripheral devices, and (ii) one or more shared signals that are shared among the peripheral devices served by the bus. The processor is connected to the bus as an additional device in addition to the peripheral devices, and is configured to disrupt on the bus a transaction in which a bus-master device attempts to access a given peripheral device, by disrupting a dedicated signal associated with the given peripheral device.

In some embodiments, the processor is configured to retain the shared signals on the bus uninterrupted while disrupting the transaction. In an embodiment, the interface includes (i) an input for receiving the dedicated signal from the bus-master device and (ii) an output for sending the dedicated signal to the given peripheral device, and the processor is configured to disrupt the transaction by preventing the dedicated signal received at the input from being sent on the output. In some embodiments, the processor is configured to respond to the bus-master instead of the given peripheral device, while the dedicated signal is disrupted. In an example embodiment, the dedicated signal includes a Chip-Select (CS) signal.

In a disclosed embodiment, the processor is configured to detect the transaction to be disrupted, by monitoring the bus. In an alternative embodiment, the processor is configured to detect the transaction to be disrupted, by communicating with the bus-master device over an auxiliary interface that is external to the bus.

In an embodiment, the processor is configured to disrupt the dedicated signal indefinitely, until a reset. In another embodiment, the processor is configured to disrupt the dedicated signal for a finite time period after detecting the transaction. In an embodiment, by disrupting the transaction, the processor is configured to cause a transaction abort at one or more of the peripheral devices. In some embodiments, the processor is configured to resume normal operation of the bus following disruption of the transaction.

There is additionally provided, in accordance with an embodiment of the present invention, a security device including an interface and a processor. The interface is configured for connecting to a bus that serves one or more peripheral devices. The processor is connected to the bus in addition to the peripheral devices and is configured to disrupt on the bus a transaction in which a bus-master device attempts to access a given peripheral device, by responding to the bus-master instead of the given peripheral device.

In an embodiment, the bus includes (i) one or more dedicated signals that are each dedicated to a respective one of the peripheral devices, and (ii) one or more shared signals that are shared among the peripheral devices served by the bus, and the processor is configured to disrupt the transaction by (i) disrupting a dedicated signal associated with the given peripheral device, and (ii) responding to the bus-master while the dedicated signal is disrupted.

In some embodiments, the given peripheral device includes a memory device, and the processor is configured to identify, in the transaction, a request from the bus-master to read data from the memory device, and to respond to the request with alternative data stored internally in the security device. In an example embodiment, the processor is configured to disrupt the transaction and respond with the alternative data in response to identifying that the bus-master is requesting to access a predefined address zone in the memory device.

In another embodiment, the processor is configured to identify the transaction, in which the bus-master device attempts to access the given peripheral device, based on data returned by the given peripheral device to the bus-master during the transaction. In yet another embodiment, the processor is configured to identify the transaction, in which the bus-master device attempts to access the given peripheral device, based on a command code used in the transaction.

There is also provided, in accordance with an embodiment of the present invention, a method including communicating over a bus using a security device, which is connected to the bus as an additional device in addition to one or more peripheral devices, wherein the bus includes (i) one or more dedicated signals that are each dedicated to a respective one of the peripheral devices, and (ii) one or more shared signals that are shared among the peripheral devices served by the bus. A transaction, in which a bus-master device attempts to access a given peripheral device, is disrupted on the bus using the security device, by disrupting a dedicated signal associated with the given peripheral device.

There is further provided, in accordance with an embodiment of the present invention, a method including communicating over a bus using a security device, which is connected to the bus in addition to one or more peripheral devices. A transaction, in which a bus-master device attempts to access a given peripheral device, is disrupting on the bus using the security device, by responding to the bus-master instead of the given peripheral device.

Another embodiment of the present invention that is described herein provides an apparatus including an interface and a processor. The interface is configured for communicating over a bus. The processor is configured to disrupt on the bus a transaction in which a bus-master device attempts to access a peripheral device without authorization, by forcing one or more dummy values on at least one line of the bus in parallel to at least a part of the transaction.

In an embodiment, the processor is configured to force the dummy values on a data line of the bus, so as to disrupt transfer of respective data values that are sent to or received from the peripheral device on the data line. Additionally or alternatively, the processor is configured to force the dummy values on a clock line of the bus, so as to disrupt a clock signal used in the transaction. Further additionally or alternatively, the processor is configured to force the dummy values on a chip-select line of the bus, so as to disrupt selection of the peripheral device by the bus-master device.

In some embodiments, the bus includes an open-drain or open-collector bus having a default logical value, and the processor is configured to force the dummy values by writing an opposite of the default logical value on the at least one line of the bus.

In some embodiments, by forcing the dummy values, the processor is configured to override corresponding values that are written on the at least one line by the bus-master device or by the peripheral device. In an example embodiment, the processor is configured to override the values written by the bus-master device or by the peripheral device, by driving the at least one line with a drive strength that is stronger than the drive strength of the bus-master device or the peripheral device. In other embodiments, the apparatus includes at least one resistor, which is inserted in the at least one line and is configured to attenuate the values written by the bus-master device or by the peripheral device, relative to the dummy values written by the processor.

In some embodiments, the processor is configured to force the dummy values using only existing lines of the bus that are used for communicating between the bus-master device and the peripheral device. In some embodiments, the processor is configured detect the transaction to be disrupted, by monitoring the bus. In an embodiment, the processor is configured detect the transaction to be disrupted, by communicating with the bus-master device over an auxiliary interface that is external to the bus.

In a disclosed embodiment, the processor is configured to force the dummy values indefinitely, until the apparatus is reset. In another embodiment, the processor is configured to force the dummy values for a finite time period after detecting the transaction. In an embodiment, the processor is configured to gracefully resume normal operation of the bus following disruption of the transaction.

There is additionally provided, in accordance with an embodiment of the present invention, a system including a peripheral device and a security device. The peripheral device is accessible to one or more bus-master devices over a bus. The security device is configured to disrupt on the bus a transaction in which a bus-master device attempts to access the peripheral device without authorization, by forcing one or more dummy values on at least one line of the bus in parallel to at least a part of the transaction.

There is further provided, in accordance with an embodiment of the present invention, a method including, using a security device coupled to a bus, deciding to disrupt a transaction in which a bus-master device attempts to access a peripheral device without authorization. The transaction is disrupted by forcing one or more dummy values on at least one line of the bus in parallel to at least a part of the transaction.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and devices for securing access to peripheral devices over bus interfaces. Peripheral devices may comprise, for example, cryptographic engines, memory devices that store sensitive data, or any other suitable device that is accessible over a bus.

In some disclosed embodiments, a security device monitors the transactions on the bus, and identifies unauthorized transactions in which a host device or other bus-master device attempts to access the peripheral device without authorization. Transactions may be classified as authorized or unauthorized using any suitable criterion or policy.

Upon identifying an unauthorized transaction, the security device disrupts the transaction by deliberately forcing the values of one or more lines or signals of the bus to some dummy values, in parallel to the transaction. Forcing of dummy values may be performed, for example, on a clock signal, a data signal and/or a chip-select (CS) signal.

Disruption of transactions by forcing dummy values on the bus is suitable, for example, for open-drain or open-collector buses such as $I^2C$, as well as for push-pull buses such as SPI. Forcing dummy values on the bus in parallel to the transaction overrides the communication to and/or from the peripheral device, and/or disrupts the respective clock signal.

Several example techniques for disrupting unauthorized transactions on $I^2C$ and SPI buses are described herein. Techniques for gracefully resuming normal operation following the disruption are also described. In some embodiments, the security device may disrupt a transaction without first detecting it on the bus, or even without monitoring the bus at all. For example, the security device may force dummy values on the chip-select (CS) line of a certain host, until or unless this host is authorized.

In some embodiments, e.g., in SPI, the bus protected by the security device comprises (i) one or more dedicated signals that are each dedicated to a respective peripheral device, and (ii) one or more shared signals that are shared among the peripheral devices served by the bus. Examples of shared signals are data and clock signals. Examples of dedicated signals are CS signals. In some embodiments, the security device is configured to disrupt the transaction by disrupting a dedicated signal associated with the protected peripheral device, while retaining the shared signals on the bus uninterrupted. Note, however, that not all buses have dedicated signals. In I²C, for example, all signals of the bus are shared signals.

In other embodiments, the security device is configured to disrupt the transaction by responding to the unauthorized host instead of the protected peripheral device. In an example embodiment, the peripheral device comprises a Flash memory containing one or more address zones allocated for storing sensitive data such as keys, configuration data and/or boot code. By selectively overriding the CS signal of the Flash memory, the security device is able to override access to this data at the Flash memory. Instead, the security device responds to the host with data stored internally at the security device. A secure boot process of this sort is described herein.

The disclosed techniques provide secure selective access to peripheral devices in real-time, on a transaction-by-transaction level. In most of the techniques described herein, both identification and disruption of transactions are performed solely using the existing signals of the bus. As such, the disclosed techniques do not require additional pins or interconnection, thereby reducing overall system size and cost.

Securing Access to Peripheral Device Over I²C Bus

Figure 1:
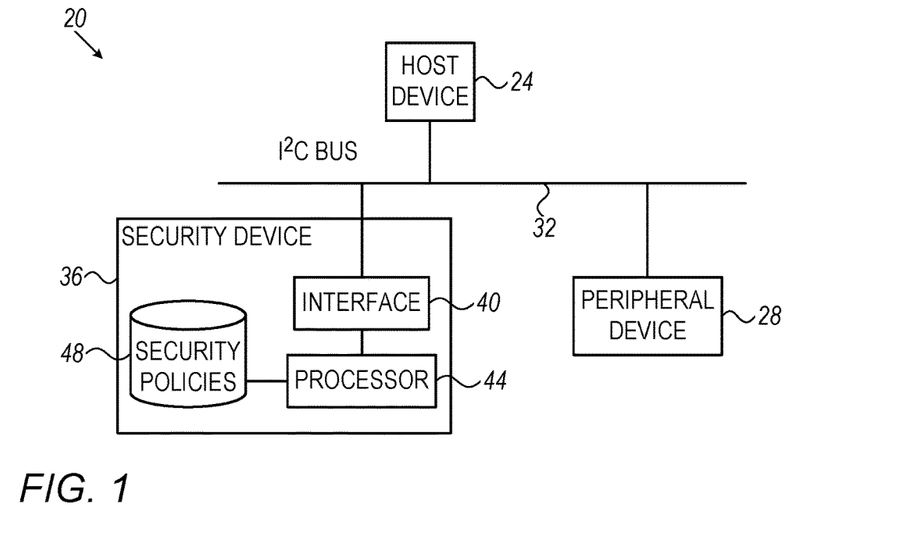
FIG. 1 is a block diagram that schematically illustrates a secured system in which multiple devices communicate over an $I^2C$ bus, in accordance with an embodiment of the present invention.

FIG. 1 is a block diagram that schematically illustrates a secured system 20, in accordance with an embodiment of the present invention. In the present example, system 20 comprises a host device 24 and a peripheral device 28 that are both connected to an I²C bus 32. Host device 24 and peripheral device 28 are also referred to herein as host and peripheral, for brevity. Host 24 is also sometimes referred to as a bus master.

A security device 36 protects the access to peripheral 28, by monitoring the transactions on the I²C bus and preventing unauthorized transactions in which host 24, or another device having bus-master capabilities, attempts to access peripheral 28 without authorization. Security device 36 is also sometimes referred to as a control device or Trusted Platform Module (TPM). In the present example, security device 36 comprises an interface 40 for connecting to I²C bus 32, a processor 44 that is configured to carry out the disclosed techniques, and a memory 48 that is configured to store one or more security policies enforced by processor 44.

Processor 44 may classify a transaction as unauthorized in accordance with any predefined or configured policy. Generally, an unauthorized transaction may attempt to write data to the peripheral, read data from the peripheral, configure or send a command to the peripheral, or access the peripheral in any other suitable way. The policy enforced by the security device may comprise a positive policy (e.g., a "whitelist"), a negative policy (e.g., a "blacklist"), a policy that depends on the device address or register offset, or any other type of policy.

For example, the host may be required to authenticate its identity to the security device before it is authorized to access the peripheral. A transaction attempted by a non-authorized host may be considered unauthorized. Authentication may be carried out, for example, using some challenge-response process between the host and the security device. Additionally or alternatively, the host may be required to prove its identity in some other suitable manner, or to successfully complete a secure boot process.

Further additionally or alternatively, some types of transactions (e.g., read transactions) may be regarded as authorized, whereas other types of transactions (e.g., write transactions) may be regarded as unauthorized. As yet another example, access to selected addresses in the peripheral may be regarded as authorized, whereas access to other addresses may be regarded as unauthorized. As another example, some bit sequences over the bus may be indicative of an unauthorized transaction.

Generally, processor 44 may distinguish between authorized and unauthorized transactions in any suitable way. The policy or policies for distinguishing between authorized and unauthorized transactions are stored in memory 48.

I²C bus 32 comprises a Serial Data (SDA) line that conveys a serial data signal, and a Serial Clock (SCL) line that carries a serial clock signal. The terms "line" and "signal" are used interchangeably herein. By monitoring the SDA and SCL lines, processor 44 is able to monitor any transaction exchanged over the I²C bus and to identify unauthorized transactions.

Upon identifying an unauthorized transaction, processor 44 disrupts the transaction by forcing one or more dummy values on the DSA and/or SCL lines of I²C bus 32. This mechanism is possible because of the open-drain/open-collector structure of the I²C bus. Typically, both the SDA and SCL lines are by default pulled-up to a state of logical "1" using pull-up resistors. Any device can force a logical "0" on the SDA or SCL line at any time by writing a "0" value, regardless of values that may be written concurrently by other devices.

Thus, in some embodiments, upon identifying an unauthorized transaction, processor 44 of security device 36 forces a logical "0" (the opposite of the default "1" logical value) on the SDA or SCL line of bus 32 using interface 40. The "0" value is regarded as a dummy value in this context. A "0" value forced on the SDA line overrides any data value that is currently being written from host 24 to peripheral 28, or read by host 24 from peripheral 28, or the default "1" value. A "0" value forced on the SCL line halts the clock signal. In either case, the transaction is disrupted.

In some embodiments, processor 44 continues to force the "0" value indefinitely, e.g., until power-up reset is performed. In other embodiments, processor 44 allows graceful recovery from the disruption, i.e., allows host 24 and peripheral 28 to recover from the disrupted transaction and resume normal operation. Some hosts and/or peripherals are incapable of recovering from a clock stall. Thus, if graceful recovery is desired even for simple hosts and peripheral devices, it may be preferable to force dummy values on the SDA line and not on the SCL line.

In an embodiment, in order to resume normal operation after disrupting a transaction, processor 44 generates an I²C STOP or RESTART condition on the bus. In the present context, an I²C STOP or RESTART condition may comprise any sequence of bus signal values that indicates to the devices that the bus is free for initiating transactions.

Processor 44 may use various techniques for allowing graceful recovery from a disrupted transaction. In one embodiment, processor 44 forces the "0" value only for a predefined time duration, which is regarded sufficient for disrupting the unauthorized transaction. Any predefined time duration can be used. For example, the SMBus specification defines a time-out of 25 mS. Therefore, in applications of SMBus-over-I²C it makes sense to set the predefined time duration to at least 25 mS, so as to trigger the time-out.

In another embodiment, processor 44 forces a "0" value on the SDA line until detecting that the SCL line is high (i.e., not toggling) for at least a predefined time period. This condition may indicate that the host terminated or aborted the transaction. Processor 44 may then release the SDA line, and possibly generate an I²C STOP condition.

In yet another embodiment, useful for disrupting transactions that read from the peripheral device, security device 36 is configured as an I²C slave having the same device address as peripheral 28. Processor 44 of security device 36 responds to any unauthorized read request with "0" data values. Peripheral 28 will also respond to these read requests in parallel to processor 44, but the data values it sends will be masked by the "0" values sent from security device 36. This process typically continues until the host terminates the transaction, e.g., by a STOP condition. Note that, in accordance with the I²C specification, an I²C slave does not drive the ACK/NEGACK bit when transmitting data.

In another embodiment, useful for disrupting both read and write transactions, processor 44 forces "0" values on the SDA line. Then, if host 24 does not recognize the disruption, the transaction terminates normally with "0" data on the bus instead of the data send from peripheral 28. If host 24 detects the disruption (e.g., because it supports I²C multi-master arbitration) and aborts the transaction, processor 44 may take over the transaction that was aborted by host 24, typically by generating additional clock cycles on the SCL line. Processor 44 may then complete the current byte being transferred, and terminate the transaction by issuing a STOP condition.

The disruption and recovery techniques described above are depicted purely by way of example. In alternative embodiments, processor 44 of security device 36 may use any other suitable technique for disrupting transactions and/or for allowing graceful recovery from the disruption.

In the examples above, detection of unauthorized transactions, disruption of transactions, and recovery following the disruption, are all implemented using only the existing lines of the bus. In alternative embodiments, security device 36 and host 24 are also connected by some auxiliary interface that is external to bus 32. This mechanism is feasible, for example, when security device 36 and host 24 are integrated in the same Integrated Circuit (IC) and share the SDA and SCL pins of the IC.

In these embodiments, security device 36 and host 24 use the auxiliary interface for verifying that no other host device accesses peripheral device 28. In an example embodiment, host 24 notifies security device 36, over the auxiliary interface, whenever it accesses peripheral 28. In response to the notification, processor 44 does not force dummy "0" values on the bus and allows the transaction to take place. Upon detecting a transaction that accesses peripheral 28 but was not reported on the auxiliary interface, processor 44 assumes that this transaction is issued by some unauthorized host, and disrupts it by forcing "0" values.

Figure 2:
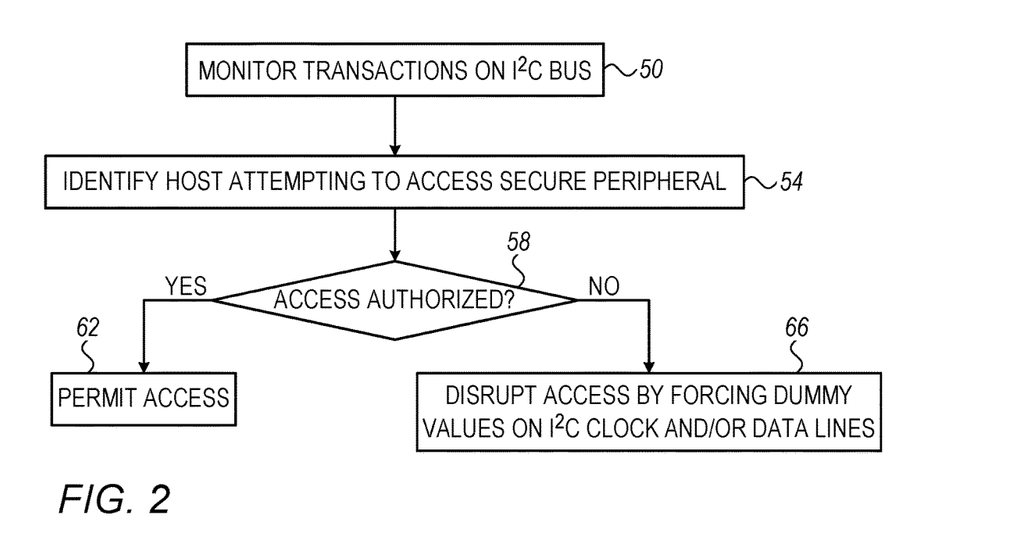
FIG. 2 is a flow chart that schematically illustrates a method for securing access to a peripheral device over an $I^2C$ bus, in accordance with an embodiment of the present invention.

FIG. 2 is a flow chart that schematically illustrates a method for securing access to peripheral device 28 over I²C bus 32, in accordance with an embodiment of the present invention. The method begins with processor 44 of security device 36 monitoring the transactions on I²C bus 32 using interface 40, at a monitoring step 50.

At a transaction detection step 54, processor 44 identifies a transaction in which a host 24 attempts to access peripheral 28. Processor 44 checks whether the transaction is authorized or not, at a checking step 58. For example, processor 44 may check whether the transaction violates some security policy that is stored in memory 48.

If the transaction is found authorized, processor 44 allows the transaction to proceed normally, at a granting step 62. Otherwise, if the transaction is found unauthorized, processor 44 disrupts the transaction by forcing dummy "0" values on the SCL and/or SDA lines of bus 32, at a disruption step 66.

Securing Access to Peripheral Device Over SPI Bus

Figure 3:
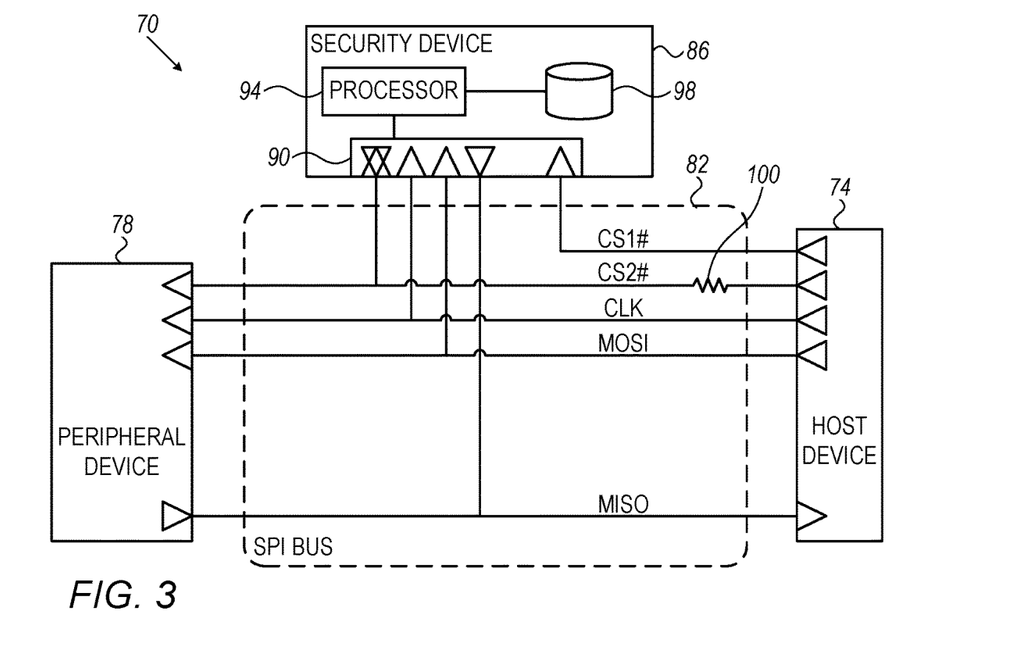
FIGS. 3-5 are block diagrams that schematically illustrate secured systems in which multiple devices communicate over an SPI bus, in accordance with alternative embodiments of the present invention.

FIG. 3 is a block diagram that schematically illustrates a secured system 70, in accordance with an alternative embodiment of the present invention. In the example of FIG. 3, system 70 comprises a host device 74, a peripheral device 78 and a security device 86, all connected to an SPI bus 82.

Security device 86 identifies and disrupts transactions in which host 74 attempts to access peripheral 78 without authorization. In the present example, security device 86 comprises an interface 90 for connecting to SPI bus 82, a processor 94 that is configured to carry out the disclosed techniques, and a memory 98 that is configured to store one or more security policies enforced by processor 94.

The security policies that distinguish between authorized and unauthorized transactions, and the manner in which processor 94 of security device 86 identifies unauthorized transactions, are essentially similar to those described above with regard to system 20. The techniques described below differ from those described above in the way security device 86 forces dummy values on bus 82 for disrupting unauthorized transactions.

SPI bus 82 comprises a clock (CLK) line, and two data lines referred to as Master-Out Slave-In (MOSI) and Master-In Slave-Out (MISO). The CLK, MISO and MOSI lines are common to all devices (in the present example devices 74, 78 and 86). In addition, each slave device is selectable using a dedicated Chip-Select (CS) line. In the present example, host 74 selects peripheral 78 using a CS line denoted CS2#, and selects security device 86 using a CS line denoted CS1#.

Host 74, being a master, is connected to all CS lines. The peripheral devices, on the other hand, are slaves and therefore each peripheral is only connected to its own CS line. Typically, host 74 initiates a transaction by selecting the desired peripheral using the respective CS line, and then communicates with the device using the CLK, MOSI and MISO lines. The MOSI line is used for transmitting from the host to the peripheral, and the MISO line is used for transmitting from the peripheral to the host.

Security device 86, unlike a conventional SPI slave, is defined as a slave but is nevertheless able to drive all CS lines. As can be seen in FIG. 3, interface 90 of security device 86 is configured to drive the CS2# line in parallel to host device 74. When the system comprises multiple peripheral devices 78 having respective CS lines, security device 86 is typically configured to drive any of the CS lines in parallel to host device 74.

In some embodiments, the system is designed such that when host 74 and security device 86 drive a CS line with opposite logical values, the logical value driven by security device 86 will override the logical value driven by host 74. In other words, if host 74 and security device 86 drive a CS line with opposite logical values, the peripheral will receive and act according to the logical value driven by security device 86.

Overriding the CS line is another example of blocking the transaction on the bus in order to disrupt an unauthorized transaction between a host and a peripheral. The above overriding mechanism can be implemented in various ways. The description that follows refers to the CS2# line used for selecting peripheral 78, but the same mechanisms apply when using multiple peripherals and multiple respective CS lines.

In one embodiment, the line driver that drives the CS2# line in interface 90 by security device 86 is stronger than the line driver that drives the CS2# line by host 74. In an alternative embodiment, a serial resistor 100 may be inserted in the CS2# line, at the output of host 74. Resistor 100 attenuates the output of the CS2# line driver of host 74, relative to the output of the CS2# line driver of security device 86. Further alternatively, security device 86 may be configured to override host 74 in driving the CS2# line in any other suitable way.

Processor 94 of security device 86 may identify an unauthorized transaction in any suitable way, by monitoring the CS#, CLK, MISO and/or MOSI lines of SPI bus 82. In some embodiments, upon identifying a transaction in which host 74 attempts to access a certain peripheral 78 without authorization, processor 94 of security device 86 disrupts the transaction by de-asserting the CS line of that peripheral. Since security device 86 is configured to override host 74 in driving the CS2# line, the peripheral will be de-selected, and the transaction will be disrupted. On the other hand, upon deciding that a transaction is authorized, processor 94 deactivates its CS2# line driver, thereby allowing the host to access peripheral 78 without interruption.

Figure 4:
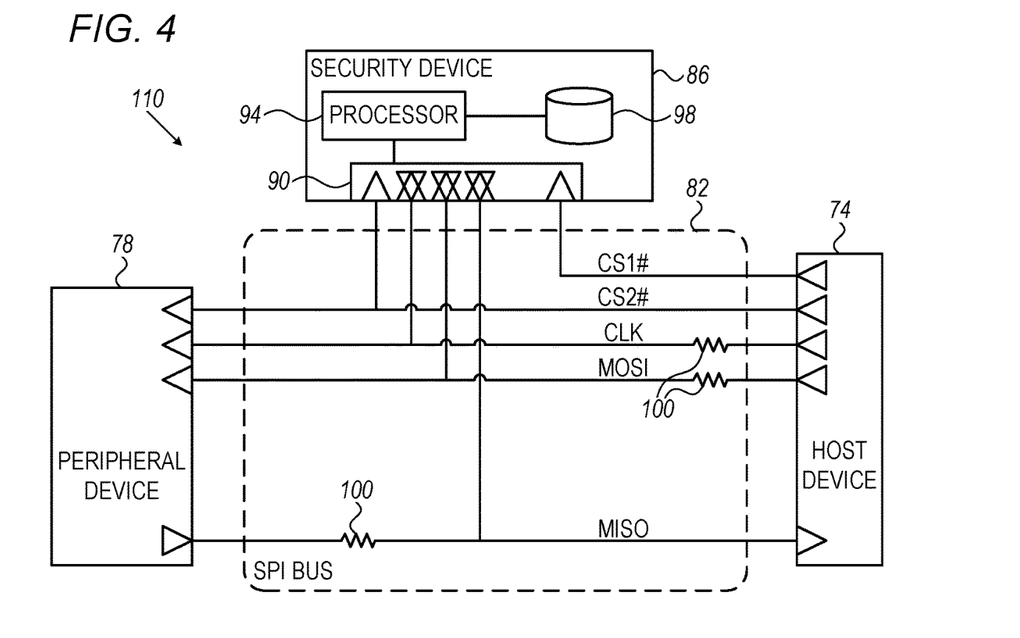

FIG. 4 is a block diagram that schematically illustrates a secured system 110, in accordance with another embodiment of the present invention. System 110 is also based on SPI bus 82, similarly to system 70 of FIG. 3. In system 110, however, instead of overriding the CS line, security device 86 disrupts unauthorized transactions by forcing dummy values on the CLK line, MISO line and/or MOSI line.

In the present example, system 110 is configured such that security device 86 overrides host 74 in driving the CLK line, MISO line and/or MOSI line. As can be seen in the figure, serial resistors 100 are inserted in the CLK, MISO and MOSI lines for this purpose. Since the CS2# line is not overridden in this example, no serial resistor is inserted therein.

In alternative embodiments, the overriding mechanism can be implemented by making the line drivers of the CLK, MISO and/or MOSI lines in security device 86 stronger than the corresponding line drivers in host 74.

In other embodiments, hybrid schemes that involve both overriding the CS line (as in FIG. 3) and overriding the CLK, MISO and/or MOSI lines (as in FIG. 4) are also feasible.

Securing access to peripheral device by overriding dedicated point-to-point signals The signals of a bus, e.g., SPI, can be divided into shared signals and dedicated signals. A shared signal is a signal that is connected in parallel to multiple (e.g., all) peripheral devices on the bus. Examples of shared SPI signals are data (MOSI and MISO) and clock (CLK) signals. A dedicated signal is a signal that is dedicated to a specific peripheral. One example of a dedicated signal which is part of the bus is a Chip Select (CS) signal. In addition, the bus may be augmented with out-of-band dedicated signals, for example, Write Protect (WP) signal (when the peripheral comprises a memory device). A dedicated signal may also be referred to as a Point-To-Point (PTP) line.

In some embodiments, one or more of the dedicated signals pass through security device 86 before reaching the peripheral devices. The shared signals, in contrast, are routed conventionally to the peripheral devices and do not pass through the security device. This interconnection scheme enables the security device to secure the peripheral devices effectively, as will be described below.

Figure 5:
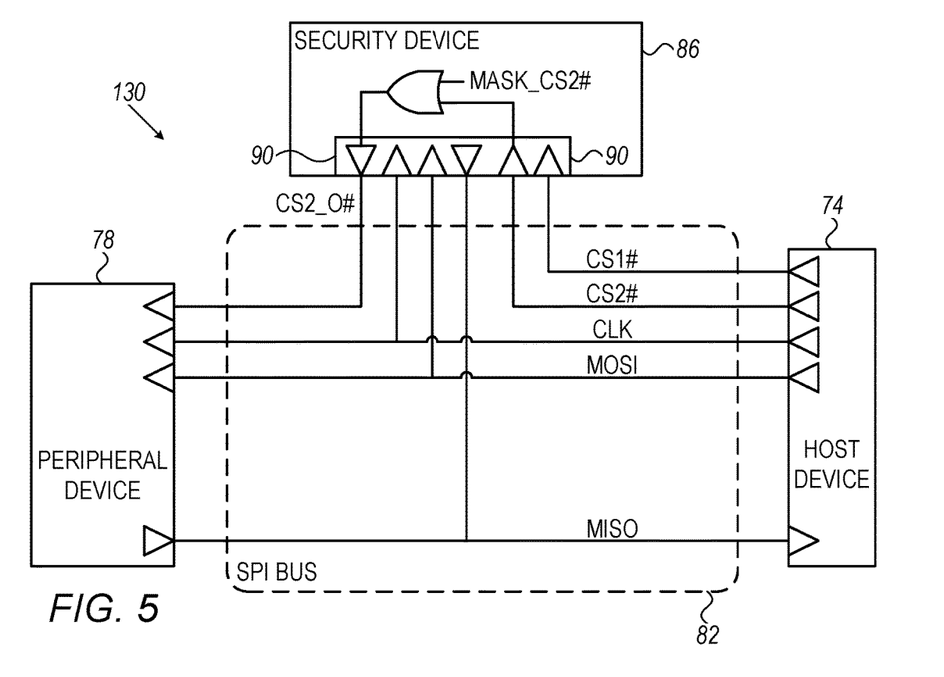

FIG. 5 is a block diagram that schematically illustrates a secured system 130, in accordance with an alternative embodiment of the present invention. The system is similar to system 70 of FIG. 3. In the present embodiment, however, the CS2# signal does not drive the input of peripheral 78 directly. Instead, the CS2# line from host 74 is input to the security device 86, and in turn, security device 86 drives a signal denoted CS2_O# that is connected to the input of peripheral 78.

In the present embodiment, the CS2# signal serves as an example of a dedicated PTP signal that passes through the security device en-route to the peripheral device being protected. As can be seen in the figure, the shared signals (MOSI, MISO and CLK) are unbroken between host 74 and peripheral 78.

Security device 86 is configured to disrupt transactions between host 74 and peripheral 78, by selectively enabling the CS2# signal to arrive at the peripheral, or preventing the CS2# signal from reaching the peripheral. This selection is performed, in the example of FIG. 5, by asserting or de-asserting a control signal denoted MASK_CS2#.

Figure 6:
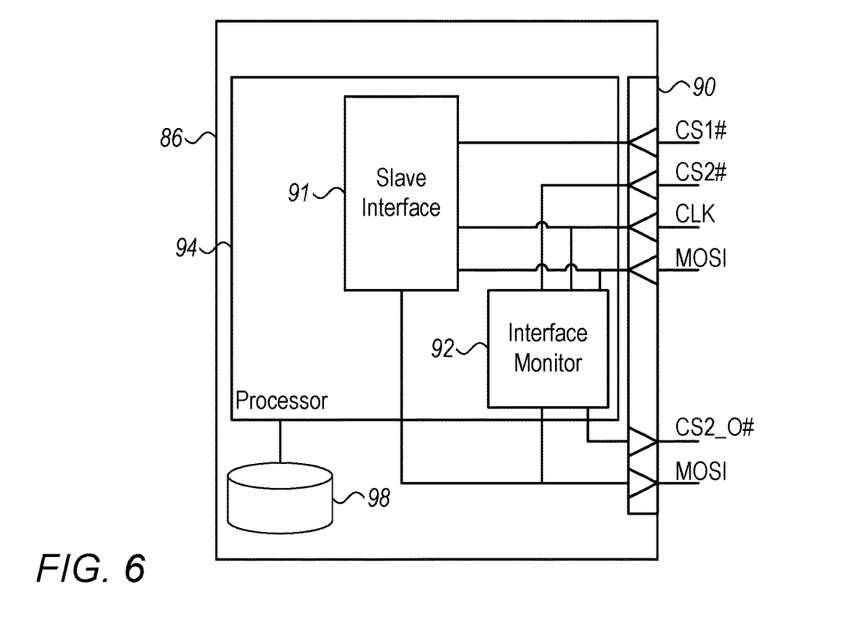
FIG. 6 is a block diagram that schematically illustrates a security device, in accordance with an embodiment of the present invention.

FIG. 6 is a block diagram of security device 86 of system 130 described in FIG. 5, in accordance with an embodiment of the present invention. In the present example, security device 86 comprises an interface 90 for connecting to SPI bus 82, a processor 94 that is configured to carry out the disclosed techniques, and a memory 98 that is configured to store one or more security policies enforced by processor 94. Processor 94 comprises slave interface logic 91 and Interface Monitor Logic (IML) 92. Slave interface logic 91 handles the communication between security device 86 and host 74. IML 92 monitors, controls and selectively overrides the access of host 74 to peripheral 78.

In one embodiment, security device 86 identifies and disrupts transactions in which host 74 attempts to access peripheral 78 on SPI bus 82 without authorization. It can be understood from FIGS. 5 and 6 that any security feature that is possible in the system described in FIG. 3, can also be implemented in the system of FIG. 5.

In the embodiments described above, the security device is connected to the bus and configured as an additional slave device. In other embodiments, however, the security device may be connected and configured as a master device. Such implementations are applicable, for example, in bus protocols that support multi-master capability.

Protection Against Unauthorized Transactions by Security Device Responding on Behalf of Peripheral Device In another embodiment, security device 86 responds to selected host transactions on behalf of peripheral 78. The description that follows refers mainly to the configuration of FIGS. 5 and 6 above, purely by way of example. Generally, the disclosed technique is not limited to this specific system configuration and may be applied using any other configuration, e.g., the configuration of FIG. 3 or FIG. 4 above.

In an example embodiment relating to the configuration of FIGS. 5 and 6, upon detection of a read command form a certain address zone within the address space of peripheral 78, IML 92 can force CS2_O# to 'high' and serve the host read command (or a portion of the read command) from internal memory 98 of the security device. Host 74 is typically unaware that the response does not originate from the peripheral. In some embodiments this scenario is also applicable to system 110 of FIG. 4, for example when the MISO signal is overridden by the security device.

One example use-case of this mechanism is a system in which peripheral 78 comprises an SPI Flash memory device, and security device 86 is configured to override part of the Flash address space and in this manner provide a secured Flash emulation for that address zone. For example, security device 86 may comprise a TPM that uses IML 92 to override the Flash address zone that contains the initial host boot code (the first boot commands which are fetched by the host on boot). The TPM may override this Flash address zone with self-contained authenticated initial boot code that, for example, authenticates the rest of the code before jumping to it.

In some embodiments, security device 86 further comprises a master interface to the SPI Flash device. In addition, security device 86 may comprise a suitable interface and circuitry to maintain host 74 at reset while accessing to the SPI Flash device, typically as part of the system boot process. Security device 86 can be, for example, an embedded controller (EC), a super I/O (SIO) or a baseboard management controller (BMC) device.

Figure 7:
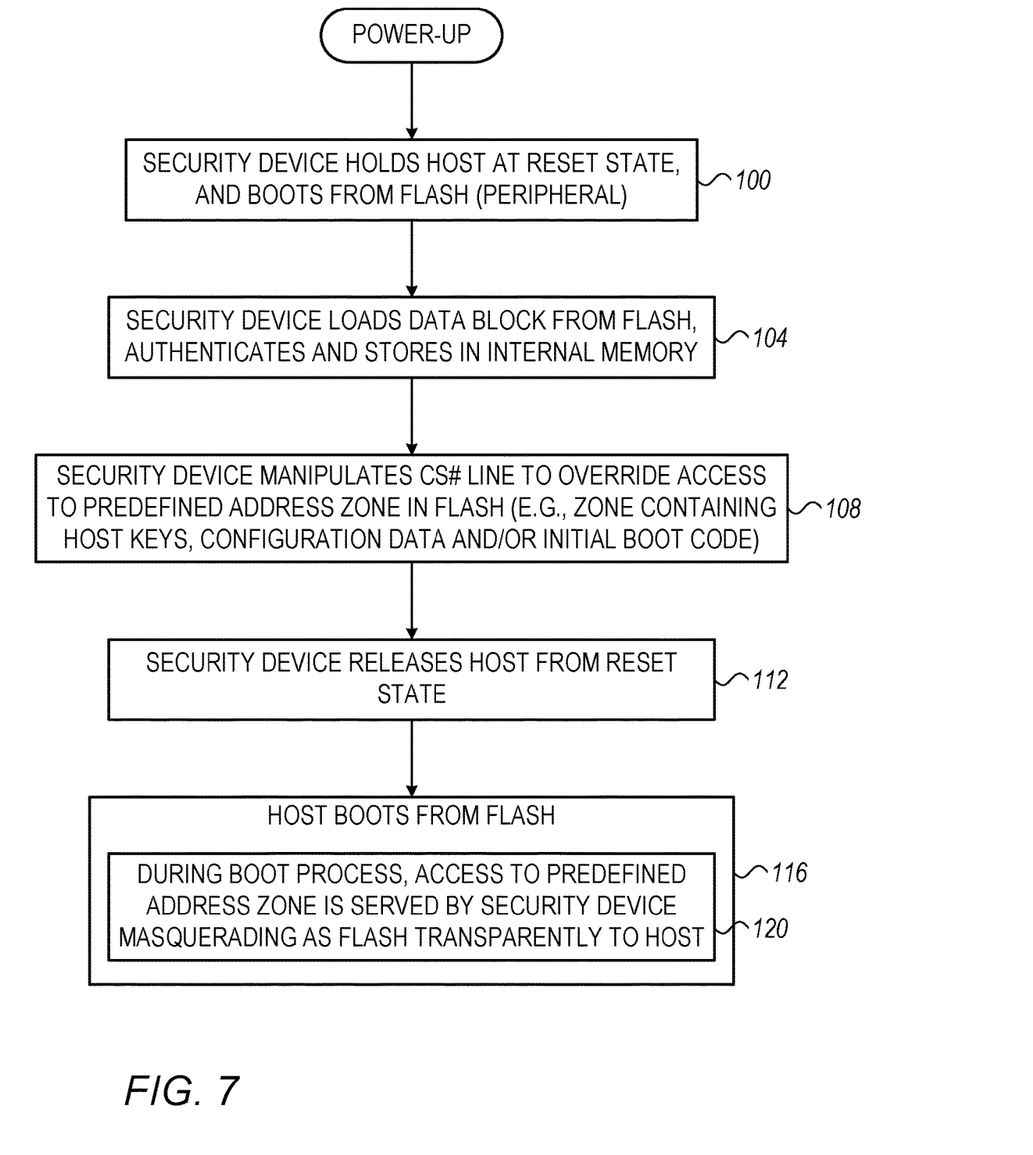
FIG. 7 is a flow chart that schematically illustrates a method for secure booting of a host device, in accordance with an embodiment of the present invention.

FIG. 7 is a flow chart that schematically illustrates an example of such a secure boot process, in accordance with an embodiment of the present invention. The method begins at power-up, i.e., assertion of system power. At a reset holding step 100, security device 86 holds host 74 at reset and boots, optionally from SPI Flash (peripheral 78). At an (optional) initial loading step 104, security device 86 loads a data block from the SPI Flash, verifies the authenticity of the data block and stores it internally in memory 98.

At an overriding step 108, security device 86 configures IML 92 to override access to at least one predefined address zone in the SPI Flash (peripheral 78 in the present example). The address zone in question may contain, for example, one or more keys, configuration data and/or an initial boot block of host 74.

At a reset releasing step 112, security device 86 releases the host from reset. Thus, at a booting step 116, host 74 begins its boot process. As part of the boot process, at a zone accessing sub-step 120, access to the predefined address zone is served by security device 86 from internal memory 98.

In this manner, sensitive information such as keys, configuration data and/or initial boot code, can be served securely from the security device. Host 74 is unaware of the fact that this information is served from the security device and not from the SPI Flash.

The method of FIG. 7 is depicted as an example for demonstrating how a security device can override access to a predefined address zone of a peripheral device. In alternative embodiments, any other suitable method can be used for this purpose. Alternatively to masquerading as the SPI Flash device, the security device may protect the Flash device (or other peripheral device) by overriding and/or disrupting unauthorized transactions in any other suitable way.

Moreover, overriding of unauthorized transactions is not limited to protecting a specific predefined address zone. For example, overriding may be triggered based on the returned data from the protected peripheral, or on the SPI command code. For example, the security device may enforce a security policy that disables programming, erasure, write-enabling, status/configuration and/or any other command or functionality of the Flash device. An example specification of SPI Flash commands and instructions is specified by Winbond Electronics Corporation, in "SPI Flash—3V Serial Flash Memory with Dual/Quad SPI and QPI," Aug. 24, 2015.

As another example, in the method of FIG. 7 the sensitive information resides in the Flash device to begin with, and is read by the security device as part of the boot process. In alternative embodiments, the sensitive information may be stored initially in the security device (either in addition to or instead of in the Flash memory). In such embodiments, there is no need for reading this information from the Flash device to the security device.

As yet another example, the method of FIG. 7 is described with reference to an SPI bus. In alternative embodiments, a security device may override access to a predefined address zone of a peripheral device in other buses and protocols, using any of the dedicated signals (if any) and/or the shared signals of the bus. The $I^2C$ bus, for example, is a pull-up bidirectional bus that is designed to support multiple slave devices and multiple master devices. As such, the protocol has an embedded mechanism to handle contention between devices. For example, when an $I^2C$ device detects '0' on the SDA line while trying to set '1' (pull-up), the device assumes contention and releases the bus until the next transaction. In one embodiment, an $I^2C$ security device (e.g., device 36 of FIG. 1) is configured to overlap some of the address space of another peripheral slave (e.g., device 28 of FIG. 1). The security device can, for example, be configured to answer the same data as expected from the other peripheral. If the security device detects a data mismatch (e.g., attempts to pull-up '1' but senses '0' on the SDA line), the security device may initiate responsive action (e.g., cause a stop condition, drive '0' on one or more data lines, set an endless clock stretching, or any other suitable action). This technique may utilize a conventional $I^2C$ slave device (without hardware changes in the physical layer) to monitor a device down to the data level.

In yet another embodiment, security device 86 (using ILM 92) also monitors the data phase of the SPI address. Upon recognizing a data mismatch, the security device may initiate responsive action, e.g., by chopping the transaction, resetting the system, locking access to keys or, any other suitable action.

In an example scenario, security device 86 holds a signature or a digest of a certain code section stored in the SPI Flash. The security device monitors the accesses of host 74 to the SPI Flash while calculating the signature or hash of this code section in the background. If a wrong signature, hash or SPI fetch sequence is detected, security device 86 can initiate suitable responsive action.

In yet another embodiment, the security device can monitor more than one peripheral 78 on bus 82 and verify, for example, that the access order to different devices is as expected.

In yet another embodiment, security device 86 uses one or more signals (other than CS) to restrict access to peripheral 78 or to enforce a certain system state upon detection of an authorized transaction with peripheral 78. Non-limiting examples for such signals comprise:

Any of the signals demonstrated with reference to the system of FIG. 4.
A write-protect signal of a Flash memory.
Control Reset signal.
Control power management signal.
Control power to one or more devices.

Disable system communication (e.g., by disabling a network interface controller (NIC)).

System reset.

The configuration of systems 20, 70, 110 and 130 of FIGS. 1 and 3-6 and the configurations of the various system elements such as security devices 36 and 86 and buses 32 and 82, are example configurations that are depicted purely for the sake of conceptual clarity. In alternative embodiments, any other suitable configurations can be used.

For example, the figures show only a single peripheral device and a single host device for the sake of clarity. In some embodiments, the system may comprise two or more peripheral devices and/or two or more host devices. The embodiments described herein refer to the I²C and SPI buses by way of example. In alternative embodiments, the disclosed techniques can be implemented, mutatis mutandis, with any other suitable type of bus.

The different elements of systems 20, 70, 110 and 130 may be implemented using any suitable hardware, such as in an Application-Specific Integrated Circuit (ASIC) or Field-Programmable Gate Array (FPGA). In some embodiments, some elements of security devices 32 and 86, e.g., processor 44 or processor 94, can be implemented using software, or using a combination of hardware and software elements. Memories 48 and 98 may be implemented using any suitable type of memory device, such as Random Access Memory (RAM) or Flash memory.

In some embodiments, processor 44 and/or processor 94 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the embodiments described above, the security device first detects an unauthorized transaction by monitoring the bus, and then disrupts the transaction. In alternative embodiments, the security device may disrupt a transaction without first detecting it on the bus, or without monitoring the bus at all. For example, the security device may override the chip-select (CS) line of a certain host, until or unless this host is authorized. Authorization may be carried out in any suitable manner, not necessarily using the same bus.

By way of non-limiting example, the methods and systems described herein can be used in various applications, such as in secure-memory applications, Internet-of-Things (IoT) applications, embedded applications or automotive applications, to name only a few.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A security device, comprising:
   an interface for connecting to a bus that serves one or more peripheral devices, wherein the bus comprises (i) one or more dedicated signals that are each dedicated to a respective one of the peripheral devices, and (ii) one or more shared signals that are shared among the peripheral devices served by the bus; and
   a processor, which is connected to the bus as an additional device in addition to the peripheral devices, and which is configured to disrupt on the bus a transaction in which a bus-master device attempts to access a given peripheral device, by disrupting a dedicated signal associated with the given peripheral device.

2. The security device according to claim 1, wherein the processor is configured to retain the shared signals on the bus uninterrupted while disrupting the transaction.

3. The security device according to claim 1, wherein the interface comprises (i) an input for receiving the dedicated signal from the bus-master device and (ii) an output for sending the dedicated signal to the given peripheral device, and wherein the processor is configured to disrupt the transaction by preventing the dedicated signal received at the input from being sent on the output.

4. The security device according to claim 1, wherein the processor is configured to respond to the bus-master instead of the given peripheral device, while the dedicated signal is disrupted.

5. The security device according to claim 1, wherein the dedicated signal comprises a Chip-Select (CS) signal.

6. The security device according to claim 1, wherein the processor is configured to detect the transaction to be disrupted, by monitoring the bus.

7. The security device according to claim 1, wherein the processor is configured to detect the transaction to be disrupted, by communicating with the bus-master device over an auxiliary interface that is external to the bus.

8. The security device according to claim 1, wherein the processor is configured to disrupt the dedicated signal indefinitely, until a reset.

9. The security device according to claim 1, wherein the processor is configured to disrupt the dedicated signal for a finite time period after detecting the transaction.

10. The security device according to claim 1, wherein, by disrupting the transaction, the processor is configured to cause a transaction abort at one or more of the peripheral devices.

11. The security device according to claim 1, wherein the processor is configured to resume normal operation of the bus following disruption of the transaction.

12. A security device, comprising:
    an interface for connecting to a bus that serves one or more peripheral devices; and
    a processor, which is connected to the bus in addition to the peripheral devices and is configured to disrupt on the bus a transaction in which a bus-master device attempts to access a given peripheral device, by responding to the bus-master instead of the given peripheral device,
    wherein the bus comprises (i) one or more dedicated signals that are each dedicated to a respective one of the peripheral devices, and (ii) one or more shared signals that are shared among the peripheral devices served by the bus, and wherein the processor is configured to disrupt the transaction by (i) disrupting a dedicated signal associated with the given peripheral device, and (ii) responding to the bus-master while the dedicated signal is disrupted.

13. The security device according to claim 12, wherein the given peripheral device comprises a memory device, and wherein the processor is configured to identify, in the transaction, a request from the bus-master to read data from the memory device, and to respond to the request with alternative data stored internally in the security device.

14. The security device according to claim 13, wherein the processor is configured to disrupt the transaction and respond with the alternative data in response to identifying that the bus-master is requesting to access a predefined address zone in the memory device.

15. The security device according to claim 12, wherein the processor is configured to identify the transaction, in which the bus-master device attempts to access the given peripheral device, based on data returned by the given peripheral device to the bus-master during the transaction.

16. The security device according to claim 12, wherein the processor is configured to identify the transaction, in which the bus-master device attempts to access the given peripheral device, based on a command code used in the transaction.

17. A method, comprising:
communicating over a bus using a security device, which is connected to the bus as an additional device in addition to one or more peripheral devices, wherein the bus comprises (i) one or more dedicated signals that are each dedicated to a respective one of the peripheral devices, and (ii) one or more shared signals that are shared among the peripheral devices served by the bus; and
using the security device, disrupting on the bus a transaction in which a bus-master device attempts to access a given peripheral device, by disrupting a dedicated signal associated with the given peripheral device.

18. The method according to claim 17, wherein disrupting the transaction comprises retaining the shared signals on the bus uninterrupted.

19. The method according to claim 17, wherein the interface comprises (i) an input for receiving the dedicated signal from the bus-master device and (ii) an output for sending the dedicated signal to the given peripheral device, and wherein disrupting the transaction comprises preventing the dedicated signal received at the input from being sent on the output.

20. The method according to claim 17, wherein disrupting the transaction comprises responding to the bus-master instead of the given peripheral device, while the dedicated signal is disrupted.

21. The method according to claim 17, wherein the dedicated signal comprises a Chip-Select (CS) signal.

22. The method according to claim 17, and comprising detecting the transaction to be disrupted, by monitoring the bus.

23. The method according to claim 17, and comprising detecting the transaction to be disrupted, by communicating with the bus-master device over an auxiliary interface that is external to the bus.

24. The method according to claim 17, wherein disrupting the transaction comprises disrupting the dedicated signal indefinitely, until a reset.

25. The method according to claim 17, wherein disrupting the transaction comprises disrupting the dedicated signal for a finite time period after detecting the transaction.

26. The method according to claim 17, wherein disrupting the transaction comprises causing a transaction abort at one or more of the peripheral devices.

27. The method according to claim 17, and comprising resuming normal operation of the bus following disruption of the transaction.

28. A method, comprising:
communicating over a bus using a security device, which is connected to the bus in addition to one or more peripheral devices; and
using the security device, disrupting on the bus a transaction in which a bus-master device attempts to access a given peripheral device, by responding to the bus-master instead of the given peripheral device,
wherein the bus comprises (i) one or more dedicated signals that are each dedicated to a respective one of the peripheral devices, and (ii) one or more shared signals that are shared among the peripheral devices served by the bus, and wherein disrupting the transaction comprises (i) disrupting a dedicated signal associated with the given peripheral device, and (ii) responding to the bus-master while the dedicated signal is disrupted.

29. The method according to claim 28, wherein the given peripheral device comprises a memory device, and wherein disrupting the transaction comprises identifying, in the transaction, a request from the bus-master to read data from the memory device, and responding to the request with alternative data stored internally in the security device.

30. The method according to claim 28, wherein disrupting the transaction and responding with the alternative data is performed in response to identifying that the bus-master is requesting to access a predefined address zone in the memory device.

31. The method according to claim 28, and comprising identifying the transaction, in which the bus-master device attempts to access the given peripheral device, based on data returned by the given peripheral device to the bus-master during the transaction.

32. The method according to claim 28, and comprising identifying the transaction, in which the bus-master device attempts to access the given peripheral device, based on a command code used in the transaction.

* * * * *